United States Patent [19]

Abe

[11] Patent Number: 5,524,203
[45] Date of Patent: Jun. 4, 1996

[54] DISK CACHE DATA MAINTENANCE SYSTEM

[75] Inventor: Yasuhiro Abe, Hokkaido, Japan

[73] Assignee: NEC Corporation, Tokyo, Japan

[21] Appl. No.: 327,781

[22] Filed: Oct. 20, 1994

[30] Foreign Application Priority Data

Dec. 20, 1993 [JP] Japan .................................. 5-318835

[51] Int. Cl.$^6$ ...................................................... G06F 12/16
[52] U.S. Cl. .................................................... 395/182.04
[58] Field of Search .............................. 395/575, 425, 395/182.04, 182.12, 182.20; 364/243.41, 245.3, 248.1, 264, 268, 268.9, 269.2, 285.3, 474.17, 474.19, 550, 943.9, 944.61, 964

[56] References Cited

U.S. PATENT DOCUMENTS

| | | | |
|---|---|---|---|
| 4,835,686 | 5/1989 | Furuya et al. ............................ | 364/200 |
| 4,920,478 | 4/1990 | Furuya et al. ............................ | 364/200 |
| 5,195,100 | 3/1993 | Katz et al. ............................... | 371/66 |
| 5,218,686 | 6/1993 | Thayer .................................... | 395/425 |
| 5,233,618 | 8/1993 | Glider et al. ............................. | 371/68.1 |
| 5,274,799 | 12/1993 | Brant et al. .............................. | 395/575 |
| 5,313,612 | 5/1994 | Satoh et al. ............................. | 395/425 |
| 5,325,519 | 6/1994 | Long et al. .............................. | 395/575 |

OTHER PUBLICATIONS

Kobayashi, et al., Operating System A–VX, NFC Technical Journal, vol. 43, No. 7, pp. 105–106, NEC Corp. 1990.

*Primary Examiner*—Robert W. Beausoliel, Jr.
*Assistant Examiner*—Stephen C. Elmore
*Attorney, Agent, or Firm*—Whitham, Curtis, Whitham & McGinn

[57] ABSTRACT

A data storage system includes an uninterruptible power supply unit having a small capacity supplies electric power to devices even upon system power failure. Depending on a data write request from a user program, a control program stores the data into a disk cache buffer set in a main storage device. An asynchronous input/output (I/O) task writes the data stored in the disk cache buffer into a file of an external storage device asynchronously with processing of the control program. Upon power failure, the asynchronous I/O task saves the data of the disk cache buffer into a batched saving area of the external storage device, and before initialization of the system upon restoration of the power, the control program writes thus saved data into the file.

6 Claims, 3 Drawing Sheets

DISK CACHE DATA MAINTENANCE SYSTEM

BACKGROUND OF THE INVENTION

I. Field of the Invention

This invention relates to a disk cache dam maintenance system which, on power failure, prevents loss of disk cache data for performing asynchronous input/output processing.

II. Description of the Related Art

A conventional disk cache structure is disclosed in "Kobayashi et al., Operating System A-VX, NEC Technical Journal, vol. 43, No. 7, pp. 105–106, NEC Corporation, 1990".

The conventional disk cache structure includes a disk cache buffer of an input/output buffer region for the disk secured in a main storage device; an asynchronous input/output control section for writing data into disks in asynchronization with the generation of a write instruction by a program, and not for immediately physically writing into disk the data which are written into the disk cache buffer in accordance with the write instruction by the user's program; and a backup memory having a battery backup device for holding the contents of the disk cache buffer.

In such a buffer memory, when the program writes data into the disk cache buffer, the same data are written into the buffer memory, and even in the event of a power failure, loss of the data is prevented since the data stored in the backup memory is reflected on the disk on re-turning ON the power supply.

However, the backup memory with the battery backup device is too expensive with less storage capacity, and such a reduced capacity causes a limited capacity of the disk cache buffer, with insufficient storage of the data. Thus, the disk cache cannot perform its function and is unable to achieve its satisfactory effects.

SUMMARY OF THE INVENTION

In view of the foregoing problem of the conventional system, an object of the present invention is to provide a disk cache system having a greater data storage efficiency.

Another object of the invention is to hold data without loss of the data even in the event of a power failure during the writing of the data into an external storage device.

A disk cache data maintenance system according to a first aspect of the present invention is such that in a disk cache system in which a disk cache buffer on a main storage device temporarily stores the data by which the user program has performed a write request within an external storage device, the data is written into the file asynchronously with the write request of the user program. A disk cache data maintenance system is provided for holding data without loss of the data even in the event of a power failure during the writing of the data into the file from the disk cache buffer.

The disk cache data maintenance system includes an uninterruptible power supply unit, upon a system power failure, for supplying electric power without any power interruptions to each device constituting a computer system on generation of power failure. An asynchronous input/output (I/O) task saves data within the disk cache buffer upon occurrence of the power failure.

A control program writes into the file the data saved by the asynchronous I/O task on re-rise (e.g., reinitialization) of the computer system.

A disk cache data maintenance system according to a second aspect of the present invention is such that, in a disk cache system in which a disk cache buffer on a main storage device temporarily stores the data by which the user program has performed a write request to a file within an external storage device, the data is written into the file asynchronously with the write request of the user program.

A disk cache data maintenance system is provided for holding data without data loss even in the event of power failure during the writing of the data into the file from the disk cache buffer, and includes an uninterruptible power supply unit, which upon system power failure, supplies electric power without any power interruptions each device constituting a computer system.

A batched saving area of the external storage device is provided for batch saving therein the data within the disk cache buffer upon the power failure. An asynchronous I/O task saves the data within the disk cache buffer into the batched saving area upon the power failure. A control program instructs a batched saving of data within the disk cache buffer into the asynchronous I/O task upon acknowledgment of power failure occurrence, rejects the thereafter read and write request of data from the other user program, and writes into the file the data within the batched saving area when the computer system re-initializes.

A disk cache data maintenance system according to the second aspect of the present invention also is characterized such that the uninterruptible power supply unit supplies electric power, during system power failure, without any power interruptions to each device constituting a computer system while, at least, data within the disk cache buffer is being written into the external storage device.

A disk cache data maintenance system according to the second aspect of the present invention also is characterized such that the control program determines whether a timing of starting is due to either one of a data input/output request from the user program or an interrupt by power failure in power supply for the system or initialization of the system.

If it is determined that the start timing is due to a data output request from the user program, the requested data is transferred to the disk cache buffer and the asynchronous I/O task is made executable. Conversely, if it is determined that the start timing is due to a data input request from the user program, it is further determined whether or not the requested data is present at the disk cache buffer. If it is determined as being present, the data is transferred to the user program. Conversely, if it is determined that the data is not present therein, the data is read from a file.

If it is determined that a cause of start is power failure, an instruction that the data stored in the disk cache buffer is saved into the batched saving area is generated to make the asynchronous I/O task an executable status, and the thus now processing file is forcibly closed so that the thereafter data read and write request from the user program is prevented from being generated.

If it is determined that the start timing is due to initialization of the system, then before the user's program becomes operable, it is determined whether or not data is present at the batched saving area. If it is determined as being present, the data within the batched saving area are written into the file, and the asynchronous I/O task proceeds to determine whether or not an instruction from the control program is to save data within the disk cache buffer.

If it is determined as the saving instruction, the data is written into the batched saving area in the external storage device, and it is determined that the instruction from the control program is not to instruct saving of the data within the disk cache buffer. Further, it is determined whether or not data is present in the disk cache buffer, and if it is determined as present, the data is written into a file within the external storage.

BRIEF DESCRIPTION OF THE DRAWINGS

The invention will be understood more fully from the detailed description given herein below and from the accompanying drawings of the preferred embodiment of the invention, which, however, should not be considered as limiting the invention but are for explanation and understanding only.

Here, it should be noted that like reference numerals represent like elements throughout the disclosure.

DETAILED DESCRIPTION OF THE PREFERRED EMBODIMENT

Figure 1:
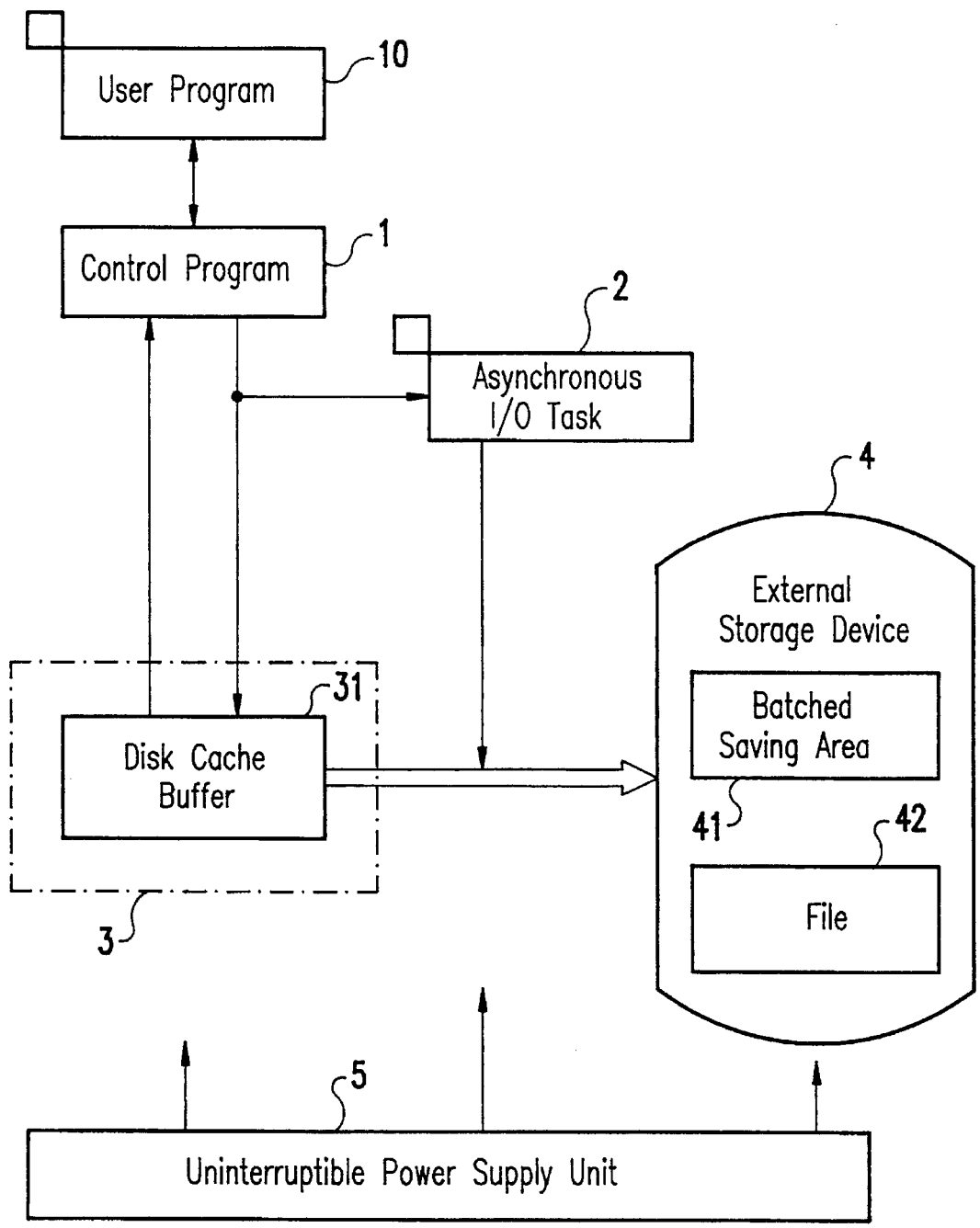
FIG. 1 is a block diagram showing a first embodiment according to the invention.

A first embodiment according to the invention is described in detail referring to the drawings.

In FIG. 1, a disk cache data maintenance system according to the invention comprises a control program 1, an asynchronous I/O task 2, a main storage device 3, an external storage device 4, an uninterruptible power supply unit 5, and a user program 10.

The main storage device 3 is set therein with a disk cache buffer 31. The external storage device 4 is provided therein with a batched saving area 41 for maintenance of the asynchronous I/O data, and a file 42 for storing the data which the user program 1 reads and writes.

The uninterruptible power supply unit 5 is to supply electric power, without any power interruption thereof, to the devices forming the computer system, upon power failure of the system power supply. The time available for such power supply may preferably be within a period from the instant of power failure occurrence and the instant that the data of the disk cache buffer 31 is completely saved in the batched saving area 41. For example, a small capacity battery is enough to meet such time.

A disk cache data maintenance system of one embodiment according to the invention is described below in detail referring to FIGS. 1 to 3.

The control program 1 starts in accordance with certain events. Namely, the events include an initialization of the system, an input/output request of data from the user program, and an interruption such as a power failure of the system power supply.

Figure 2:
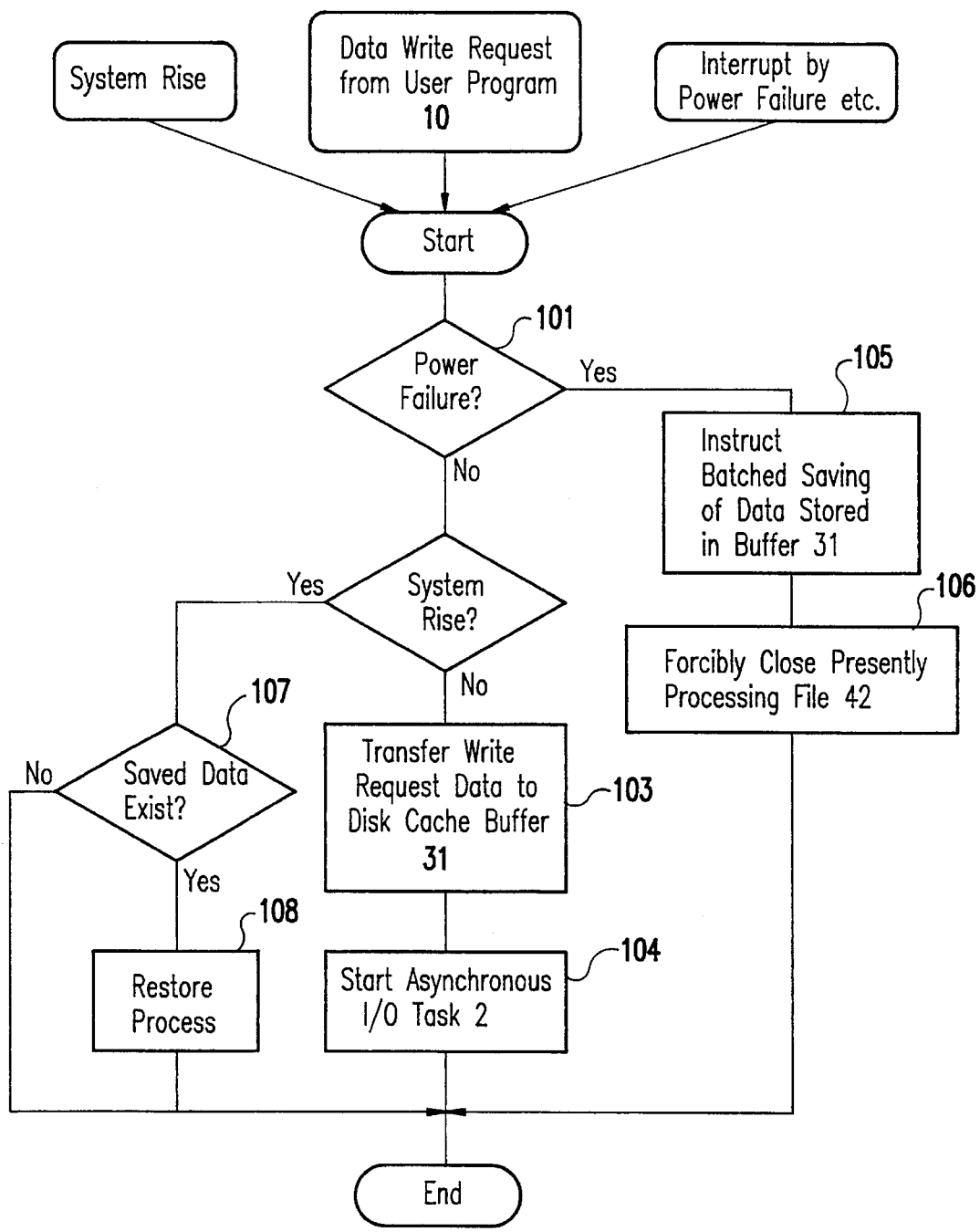
FIG. 2 is a flow chart showing a process of a control program 1 illustrated in FIG. 1 illustrating the first embodiment according to the invention.

In FIG. 2, on starting of the control program (e.g., control program 1 shown in FIG. 1), the control program proceeds to investigate whether or not a cause or timing of the start is due to a power failure of the system power supply (step 101), and if such is not the power failure, then to investigate whether or not such a timing has arisen from the system starting (step 102). If the cause is not the initialization of system, then it is determined that the start has been activated by the data input/output request from the user program.

When the control program 1 determines that the start timing is due to an output request for data from the user program, then the control program proceeds to transfer a write request to the disk cache buffer 31 (step 103), and after completion of the transfer, to make the asynchronous I/O task 2 an executable status (step 104), and to terminate the processing.

When, in step 101, the control program 1 determines that the start is caused by the power failure, then the control proceeds to instruct so that the data stored in the disk cache buffer 31 is saved into the batched saving area 41 (step 105), and to forcibly close the presently processing file 42 in order to thereafter prevent generation of the data read and write request from the user program 10 (step 106), and to terminate the processing.

In the control program 1, if it is determined that in step 102 that a start timing is caused from the initialization of the system, then before the user program 10 becomes operable, it is determined whether or not data is present in the batched saving area 41 (step 107). If it is determined as being present, then the data within the batched saving area 41 is written into the file 42 (step 108). When the control program 1 determines that data is not in the batch saving area 41 in step 107, the control terminates the processing.

In the control program 1, when the start is due to an input request of data from the user program, it is determined whether or not the requested data are present in the disk cache buffer 31, and if it is determined as existing, the data are transferred to the user program 10. If it is determined the data is not present, then the data are read from the file 42.

When the control program 1 stores data into the disk cache buffer 31 or instructs the asynchronous I/O task 2 to save the data from the disk cache buffer 31 into the batched saving area 41, the asynchronous I/O task 2 is made to have an executable status (e.g., made to execute).

Figure 3:
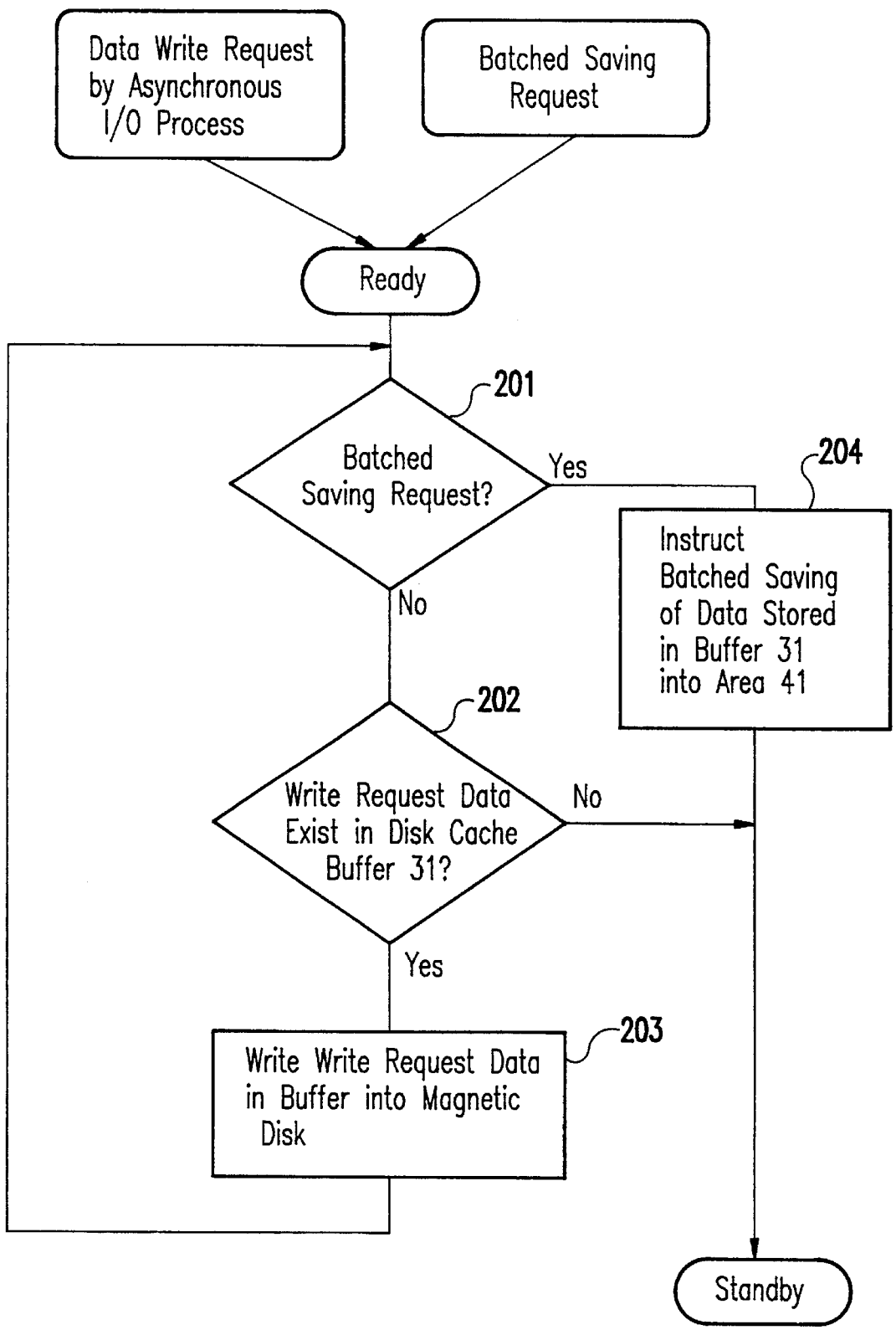
FIG. 3 is a flow chart showing a process of an asynchronous I/O task 2 illustrated in FIG. 2 illustrating the first embodiment according to the invention.

In FIG. 3, the asynchronous I/O task 2 determines whether or not an instruction from the control program 1 is to save the data (step 201). If it is not the saving instruction, then the control program proceeds to determine whether or not the data is within the disk cache buffer 31 (step 202). If it is determined as being present, then the control program writes the data within the disk cache buffer 31 into the file 42 in the external storage device 4 (step 203).

In the asynchronous I/O task 2, when it is determined that in step 201 an instruction from the control program 1 is to save the data, then the data within the disk cache buffer 31 is written into the batched saving area 41 in the external storage device 4 (step 204), and a standby condition is provided.

The asynchronous I/O task 2, even when it is determined that in step 202 the data is not within the disk cache buffer 31, is placed in a standby condition.

Accordingly, the process of the disk cache data maintenance system of a first embodiment according to the invention, is completed.

A feature of the disk cache data maintenance system according to the first embodiment of the invention, is that the uninterruptible power supply unit 5 has a smaller capacity capable of supplying electric power without any power interruption even upon power failure of the system. Further, depending on a write request of data from the user program 10, the control program 1 stores the data into the disk cache buffer 31 which is set in the main storage device 3, and the asynchronous I/O task 2 writes the data stored in the disk cache buffer 31 into the file 42 of the external storage device 4 asynchronously with the processing of the control program 1. Upon power failure, the asynchronous I/O task 2 saves the data of the disk cache buffer 31 into the batched saving area 41 of the external storage device 4, and before initialization of the system upon power restoration, the control program 1 writes the saved data into the file 42.

With this system, the disk cache data maintenance system of the first embodiment according to the invention, even upon power failure during writing data into the file 42 in the external storage device 4, the data is saved into the batched saving area 41 in the external storage device from the disk cache buffer 31, and before initialization of the system upon power restoration, the data are advantageously restored in the file 42 and held without any dam loss.

As hereinbefore described, the present invention is, in effect, for preventing data loss without requiring an expensive device as compared to the conventional example where data loss is eliminated by a backup memory having a battery backup device.

Additionally, unlike the conventional example where data loss is eliminated by the backup memory having the expensive battery backup device and having a relatively small storage capacity, according to the invention a disk cache buffer capacity is not limited, and a large amount of data can be held in the disk cache buffer. As a result, the invention provides a disk cache system having high efficiency.

Although the invention has been described in detail above in connection with various preferred embodiments thereof, it will be understood that by those skilled in the art that these embodiments have been provided solely for purposes of illustration, and are in no way to be considered as limiting the invention, Instead, various modifications and substitutions of equivalent techniques will be readily apparent to those skilled in the art upon reading this specification, and such modification and substitution are to be considered as falling within the true scope and spirit of the following claims.

What is claimed is:

1. A data storage system, comprising:

a storage device having first and second areas and storing a plurality of data in said first area;

a cache memory holding at least one of said plurality of data read from said first area of said storage device;

an uninterruptible power supply unit for receiving a first electrical power and for supplying a second electrical power to said storage device and said cache memory, said uninterruptible power supply unit for supplying said second electrical power for a time period after said first electrical power is substantially terminated; and saving means for saving data held in said cache memory into said second area of said storage device when said first electrical power is substantially terminated, said second area comprising a dedicated area for storing said data contiguously therein.

2. A data storage system according to claim 1, further comprising restoring means for writing data saved in said second area into said first area when said first electrical power is substantially restored.

3. A data storage system according to claim 1, wherein said uninterruptible power supply unit supplies said second electrical power at least until said saving means finishes saving data held in said cache memory into said second area of said storage device.

4. An information processing apparatus, comprising:

an external storage device having first and second areas and storing a plurality of data in said first area;

a main memory having a cache area for holding at least one of said plurality of data read from said first area of said storage device;

an uninterruptible power supply unit for receiving a first electrical power and for supplying a second electrical power to said external storage device and said main memory, said uninterruptible power supply unit for supplying said second electrical power for a time period after said first electrical power is substantially terminated; and saving means for saving data held in said cache area of said main memory into said second area of said external storage device when said first electrical power is substantially terminated, said second area comprising a dedicated area for storing said data contiguously therein.

5. A method of saving data in a cache memory when a power is substantially terminated, comprising steps of:

preparing a storage device having first and second areas;

preparing an uninterruptible power supply unit for supplying an electrical power to said cache memory and said storage device for a period of time when said power is substantially terminated;

storing a plurality of data in said first area of said storage device;

holding in said cache memory at least one of said plurality of data read from said first area of said storage device; and saving data held in said cache memory to said second area of said storage device when said power is substantially terminated, said second area comprising a dedicated area for storing said data contiguously therein.

6. A method according to claim 5, further comprising a step of:

writing data saved in said second area into said first area when said power is substantially restored.

* * * * *